(12) United States Patent
Dohi et al.

(10) Patent No.: US 11,054,052 B2
(45) Date of Patent: Jul. 6, 2021

(54) PIEZOELECTRIC-ELEMENT-DRIVEN VALVE AND FLOW RATE CONTROL DEVICE

(71) Applicant: FUJIKIN INCORPORATED, Osaka (JP)

(72) Inventors: Ryousuke Dohi, Osaka (JP); Kaoru Hirata, Osaka (JP); Katsuyuki Sugita, Osaka (JP); Koji Kawada, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 77 days.

(21) Appl. No.: 16/471,103

(22) PCT Filed: Dec. 22, 2017

(86) PCT No.: PCT/JP2017/046094
§ 371 (c)(1),
(2) Date: Jun. 19, 2019

(87) PCT Pub. No.: WO2018/123852
PCT Pub. Date: Jul. 5, 2018

(65) Prior Publication Data
US 2020/0018413 A1    Jan. 16, 2020

(30) Foreign Application Priority Data
Dec. 26, 2016 (JP) .............................. JP2016-251412

(51) Int. Cl.
*F16K 31/00* (2006.01)
*F16K 37/00* (2006.01)

(52) U.S. Cl.
CPC ........ *F16K 31/007* (2013.01); *F16K 37/0041* (2013.01)

(58) Field of Classification Search
CPC ........................... F16K 31/007; F16K 37/0041
(Continued)

(56) References Cited

U.S. PATENT DOCUMENTS 5,477,953 A * 12/1995 Powell et al.
6,715,731 B1 * 4/2004 Post et al.
(Continued)

FOREIGN PATENT DOCUMENTS

DE        19932961 A1 *  1/2001  ........... B25B 27/146
JP        2003120832 A    4/2003
(Continued)

OTHER PUBLICATIONS

International Search Report issued in PCT/JP2017/046094; dated Mar. 13, 2018.

*Primary Examiner* — Seth W. Mackay-Smith
(74) *Attorney, Agent, or Firm* — Studebaker & Brackett PC

(57) ABSTRACT

A piezoelectric-element-driven valve includes a valve seat provided on a flow path, a valving element detachably seated on the valve seat, and a piezoelectric element, and is configured to move the valve body by extension of the piezoelectric element. The piezoelectric-element-driven valve also is provided with a detection mechanism for detecting an extension amount of the piezoelectric element, the detection mechanism including a strain sensor, and being capable of detecting an movement amount of the valving element from an output of the strain sensor.

8 Claims, 14 Drawing Sheets

(58) Field of Classification Search
USPC .................................................. 251/129.06
See application file for complete search history.

(56) References Cited

U.S. PATENT DOCUMENTS

| | | | |
|---|---|---|---|
| 8,256,744 B2 | 9/2012 | Tanikawa et al. | |
| 9,163,743 B2* | 10/2015 | Hidaka | F16K 7/14 |
| 2010/0294964 A1 | 11/2010 | Matsumoto et al. | |
| 2013/0000759 A1* | 1/2013 | Killeen | F04B 43/046 |
| | | | 137/565.16 |
| 2014/0367596 A1* | 12/2014 | Monkowski | G05D 7/0635 |
| | | | 251/129.06 |
| 2015/0114499 A1* | 4/2015 | Dohi | F16K 31/52491 |
| | | | 137/613 |

FOREIGN PATENT DOCUMENTS

| | | | |
|---|---|---|---|
| JP | 2004138425 A | 5/2004 | |
| JP | 2007192269 A | 8/2007 | |
| JP | 2008008356 A | 1/2008 | |
| JP | 5054904 B2 | 10/2012 | |
| JP | 2013228950 A | 11/2013 | |

\* cited by examiner

Fig.3
(a)
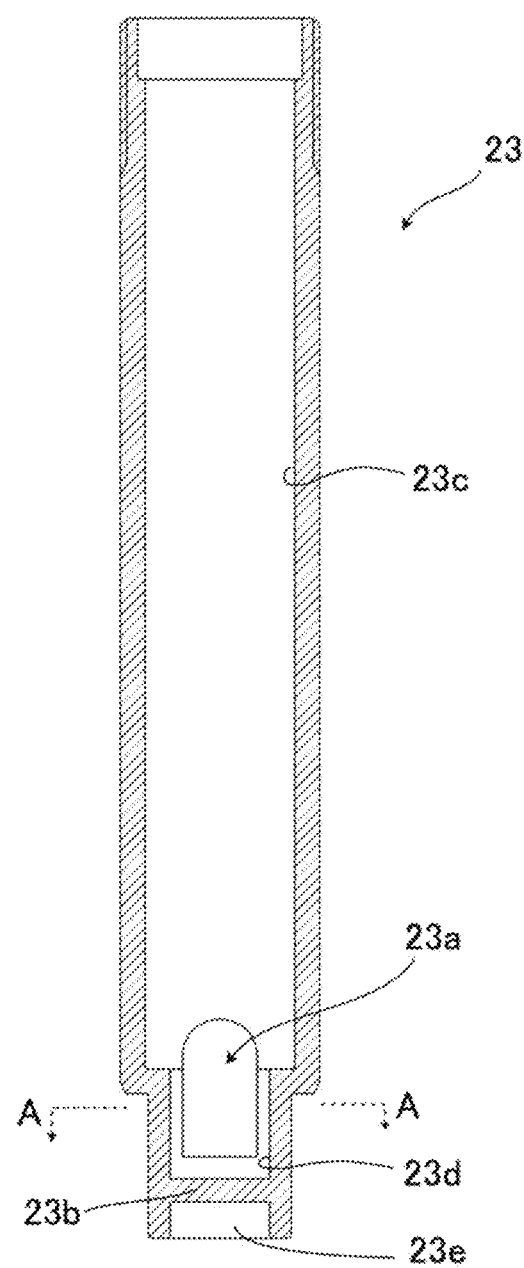
(b)
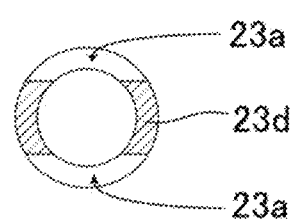

PIEZOELECTRIC-ELEMENT-DRIVEN VALVE AND FLOW RATE CONTROL DEVICE

TECHNICAL FIELD

The present invention relates to a piezoelectric-element-driven valve and a flow rate control device including the same, and in particular to a piezoelectric-element-driven valve provided in a flow rate control device used in a semiconductor manufacturing equipment, a chemical plant, or the like.

BACKGROUND ART

Since the flow rate of various fluids can be controlled with high accuracy by a relatively simple mechanism in which a piezoelectric-element-driven pressure control valve and a restriction part (for example, an orifice plate) are combined, the pressure-type flow rate control device is widely used in semiconductor manufacturing equipment and chemical plants (for example, Patent Document 1).

Patent Documents 2 and 3 disclose a piezoelectric-element-driven control valve (hereinafter, sometimes referred to as a "control valve") configured to open and close a valving element (for example, a metal diaphragm) by an actuator having a piezoelectric element (hereinafter, sometimes referred to as a "piezoelectric actuator"). The piezoelectric element drive type control valve has a normally open type and a normally closed type, and a mechanism for converting the extension of the piezoelectric actuator into the opening/closing operation of the valving element is provided corresponding to each type.

PRIOR-ART DOCUMENT

Patent Documents

[Patent Document 1] Japanese Patent Application Laid-Open No. 2004-138425
[Patent Document 2] Japanese Patent Application Laid-Open No. 2003-120832
[Patent Document 3] Japanese Patent Application Laid-Open No. 2007-192269
[Patent Document 4] Japanese Patent. No. 5,054,904

SUMMARY OF INVENTION

Technical Problem

In recent years, the flow rate control device has been required to be applied to, for example, an ALD (Atomic layer deposition), and in such an application, it is required to open and close the control valves by means of a high-speed (very short cycle) pulsed control signal. In this case, the opening/closing speed, the displacement amount, and the opening/closing frequency of the piezoelectric-element-driven control valve are remarkably increased.

As a result, the piezoelectric actuator tends to deteriorate over time due to a decrease in insulation resistance and the like, resulting in a problem that the flow rate and pressure cannot be controlled with high accuracy (for example, Patent Document 4).

That is, in the above-mentioned application, a problem may occur at a stage earlier than the durable life of the piezoelectric element drive type valve which is conventionally assumed. In this case, when a predetermined driving voltage is applied to the piezoelectric actuator, there is a possibility that the fluid flows at a flow rate greatly deviating from the previous accuracy.

In addition, if a flow control device including a conventional piezoelectric-element-driven control valve having such a problem is used in a semiconductor manufacturing process, it may be difficult to quickly and reliably determine whether or not the malfunction is caused by the piezoelectric-element-driven control valve. For this reason, the semiconductor manufacturing process is continued under a malfunction state, and a great loss may be incurred.

Further, conventionally, in the pressure type flow rate control device, the drive voltage of the control valve is feedback-controlled based on the output of the pressure sensor, and the absolute value of the drive voltage for the flow rate control has not been so problematic. That is, even if the relationship between the opening/closing degree of the actual valve and the drive voltage fluctuates due to aging or the like, no major problem has occurred from the viewpoint of flow control.

For this reason, the detection of the opening degree of the control valve has not been particularly required, but the inventor of the present application has found that if only the drive voltage is referred to, it may not be possible to appropriately detect or predict when an operation failure occurs.

The present invention has been made to solve the above-mentioned problems, and a main object thereof is to provide a piezoelectric-element-driven valve having improved performance of detecting or predicting an operation failure, and a flow control device having the same.

Solution to Problem

A piezoelectric-element-driven valve according to an embodiment of the present invention includes a valve seat provided in a flow path, a valving element detachably seated on the valve seat, and a piezoelectric element, the valving element is configured to move by extension of the piezoelectric element. The piezoelectric-element-driven valve is also provided with a detection mechanism for detecting an extension amount of the piezoelectric element, the detection mechanism includes a strain sensor, and the movement amount of the valving element is measured according to an output of the strain sensor.

In one embodiment, the piezoelectric-element-driven valve includes a support cylinder accommodating the piezoelectric element and moving by extension of the piezoelectric element, and the valving element is configured to move by movement of the support cylinder.

In one embodiment, the detection mechanism further includes a leaf spring member to which the strain sensor is fixed, and the force applied to the leaf spring member is configured to vary according to the extension of the piezoelectric element.

In one embodiment, one end of the leaf spring member is maintained in an immovable position relative to the valve body, and the other end of the leaf spring member is connected to the support cylinder.

In one embodiment, the piezoelectric-element-driven valve includes a storage device that stores a table indicating a relationship between an output of the strain sensor and a movement amount of the support cylinder, and the movement amount of the support cylinder and the valving element is detected using the table.

In one embodiment, the amount of movement of the valving element is monitored using the detection mechanism and compared with a normal state to determine whether or not there is an abnormality in the piezoelectric actuator including the piezoelectric element.

In one embodiment, the strain sensor is directly fixed to a side surface of the piezoelectric element.

In one embodiment, the strain sensor includes a longitudinal strain gauge for detecting a strain in an extension direction of the piezoelectric element, and a lateral strain gauge for detecting a strain in a direction orthogonal to the extension direction of the piezoelectric element.

In one embodiment, the piezoelectric-element-driven valve is a normally closed control valve.

In one embodiment, the piezoelectric-element-driven valve is used as a variable orifice device, and is configured to detect an orifice opening and control an opening position using the detection mechanism.

The flow rate control device according to the embodiments of the present invention includes a restriction part, any one of the piezoelectric-element-driven valves provided on the upstream side of the restriction part, a pressure sensor for measuring a gas pressure between the restriction part and the piezoelectric-element-driven valve, and an arithmetic processing circuit for determining a driving voltage of the piezoelectric-element-driven valve based on an output of the pressure sensor.

The flow rate control device according to the embodiments of the present invention includes a piezoelectric-element-driven valve used as the variable orifice device, and an arithmetic processing circuit provided for the piezoelectric-element-driven valve, and the arithmetic processing circuit is configured to feedback-control the piezoelectric-element-driven valve according to an output of the strain sensor.

Effect of Invention

According to the embodiment of the present invention, it is possible to more reliably detect or predict a malfunction in the piezoelectric-element-driven valve.

BRIEF DESCRIPTION OF DRAWINGS

FIG. 3 is a view showing the support cylinder of the valve shown in FIG. 2, (a) is a side cross-sectional view, and (b) is a cross-sectional view taken along line A-A of (a).

DESCRIPTION OF EMBODIMENTS

Embodiments of the present invention will be described below with reference to the drawings, but the present invention is not limited to the following embodiments.

Figure 1:
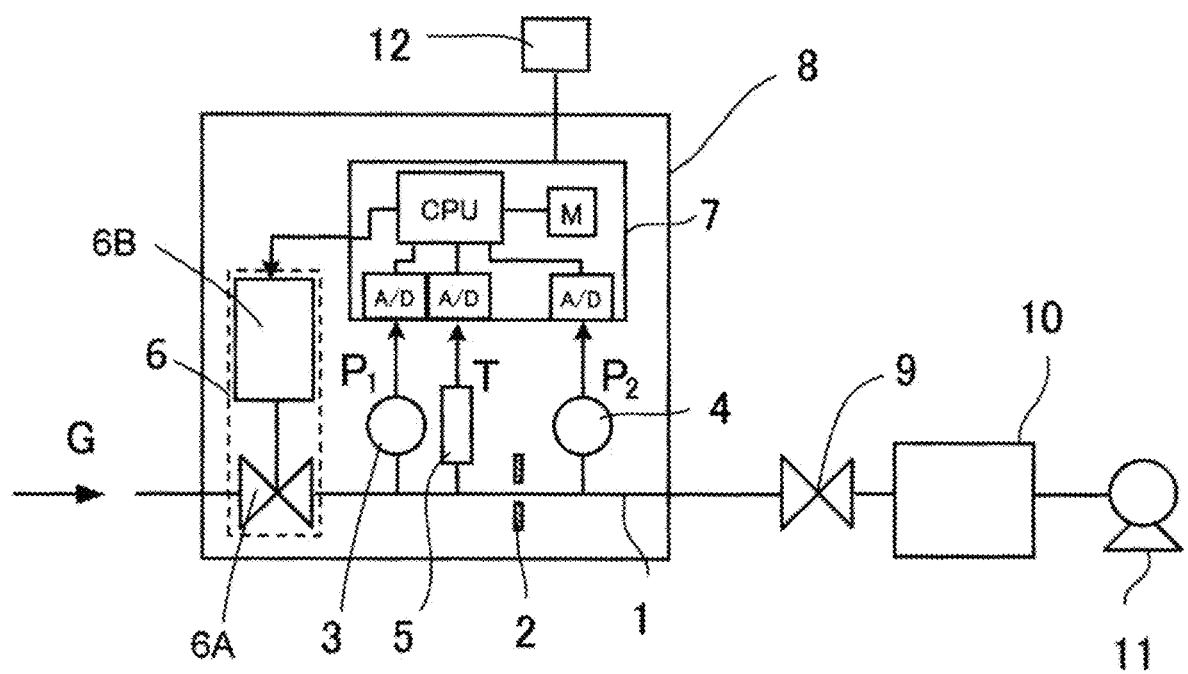
FIG. 1 is a schematic diagram showing a configuration of a flow rate control device including a piezoelectric-element-driven valve (control valve) according to an embodiment of the present invention.

FIG. 1 is a diagram showing a configuration of a pressure type flow rate control device 8 according to an embodiment of the present invention. The pressure type flow rate control device 8 (hereinafter, sometimes referred to as a flow rate control device 8) includes a restriction part 2 (for example, an orifice plate) interposed in a flow path (gas supply path) 1 through which a fluid G passes, a first pressure sensor 3 and a temperature sensor 5 provided upstream of the restriction part 2, a second pressure sensor 4 provided downstream of the restriction part 2, and a control valve 6 provided upstream of the first pressure sensor 3. The control valve 6 of the present embodiment is a piezoelectric-element-driven valve, and includes a valve mechanism 6A and a drive mechanism 6B including a piezoelectric element.

The first pressure sensor 3 can measure an upstream pressure $P_1$, which is the fluid pressure between the control valve 6 and the restriction part 2, and the second pressure sensor 4 can measure a downstream pressure $P_2$, which is the fluid pressure between the restriction part 2 and the downstream valve 9.

The flow rate control device 8 also includes an arithmetic processing circuit 7 that controls the opening/closing operation of the control valve 6 according to the outputs of the first pressure sensor 3 and the second pressure sensor 4. The arithmetic processor 7 compares the set flow rate received from an external controller 12 with the flow rate calculated from the outputs of the first and second pressure sensors 3 and 4, and controls the drive mechanism 6B of the control valve 6 so that the calculated flow rate approaches the set flow rate.

Unlike the embodiment shown in the drawing, the flow rate control device 8 may not include the second pressure sensor 4, and in this case, the arithmetic processing circuit 7 can calculate the flow rate according to the output of the first pressure sensor 3. In a preferred embodiment, the arithmetic processing circuit 7 is configured to correct the calculated flow rate according to the fluid temperature measured by the temperature sensor 5.

The flow control device 8 may also include an inlet pressure sensor 13 (see FIG. 5) upstream of the control valve 6 for measuring the gas supply pressure. The inflow pressure sensor 13 can measure the pressure of the gas supplied from a gas supply device, for example, a raw material vaporizer, connected to the upstream side, and can be used to control the gas supply amount or the supply pressure.

As the restriction part 2, a critical nozzle, a sonic nozzle, or the like may also be used in addition to an orifice member such as an orifice plate. The aperture diameter of the orifice or the nozzle is set to, for example, 10 μm to 500 μm. The restriction part 2 functions as a restriction part having a fixed opening degree.

As the downstream valve 9, for example, a known fluid-operated valve in which the supply of compressed air is controlled by a solenoid valve can be used. It should be noted that, an orifice-built-in valve with an orifice member disposed in the vicinity of an on-off valve is well known, and the orifice-built-in valve may be integrated into the flow rate control device 8 as a unified configuration of the restriction part 2 and the downstream valve 9.

The flow path 1 of the flow rate control device 8 may be configured by a pipe, or may be configured by a flow path hole formed in a metal block. The first and second pressure sensors 3 and 4 may include, for example, a silicon single crystal sensor chip and a metal diaphragm.

In the present embodiment, the control valve 6 is a piezoelectric-element-driven control valve that opens and closes the valve mechanism 6A including, for example, a metallic diaphragm as a valving element, using a drive mechanism 6B configured by a piezoelectric actuator. The detailed configuration of the control valve 6 will be described later.

In a fluid supply system including the flow rate control device 8 configured as described above, the upstream side of the control valve 6 is connected to a gas supply source such as a raw material gas, an etching gas, or a carrier gas, and the downstream side of the second pressure sensor 4 is connected to a process chamber 10 of a semiconductor manufacturing equipment via the downstream valve 9. A vacuum pump 11 for performing a vacuum process is connected to the process chamber 10, and typically, the inside of the process chamber 10 is evacuated when gas is supplied.

The flow rate control device 8 of the present embodiment is a pressure type flow rate control device, and performs flow rate control using the principles that when the critical expansion condition $P_1/P_2 \geq$ about 2 ($P_1$: gas pressure upstream of the restriction part (upstream pressure), $P_2$: gas pressure downstream of the restriction part (downstream pressure)) is satisfied, the flow speed of the gas passing through the restriction part is fixed to the sonic velocity, and the flow rate is determined by the upstream pressure $P_1$ regardless of the downstream pressure $P_2$. When the critical expansion condition is satisfied, the flow rate Q downstream of the restriction part is given by $Q=K_1P_1$, where $K_1$ is a constant dependent on the fluid type and the fluid temperature, and the flow rate Q is proportional to the upstream pressure $P_1$. When the second pressure sensor 4 is provided, the flow rate can be calculated even when the difference between the upstream pressure $P_1$ and the downstream pressure $P_2$ is small and the above-mentioned critical expansion condition is not satisfied, and the flow rate Q can be calculated from a predetermined equation $Q=K_2 P_2^m (P_1-P_2)^n$ (where $K_2$ is a constant depending on the fluid type and the fluid temperature, m and n are indexes derived from the actual flow), based on the upstream pressure $P_1$ and the downstream pressure $P_2$ measured by each pressure sensor.

In order to perform flow rate control, the set flow rate set in the external control device 12 is sent from the external control device 12 to the arithmetic processing circuit 7. Based on the output of the first pressure sensor 3 (the upstream pressure $P_1$), optionally the output of the second pressure sensor 4 (the downstream pressure $P_2$), and the output of the temperature sensor 5 (the gas temperature $T_1$), using the flow rate calculation formula in the critical expansion condition or the non-critical expansion condition, the calculation circuit 7 calculates the flow rate from the above-mentioned $Q=K_1P_1$, or $Q=K_2P_2^m (P_1-P_2)^n$, and controls the control valve 6 so that the flow rate of the fluid passing through the restriction part 2 approaches the set flow rate. The calculated flow rate may be output to the external control device 12 and displayed as a flow rate output value.

Hereinafter, the control valve 6 of the present embodiment will be described in detail.

Figure 2:
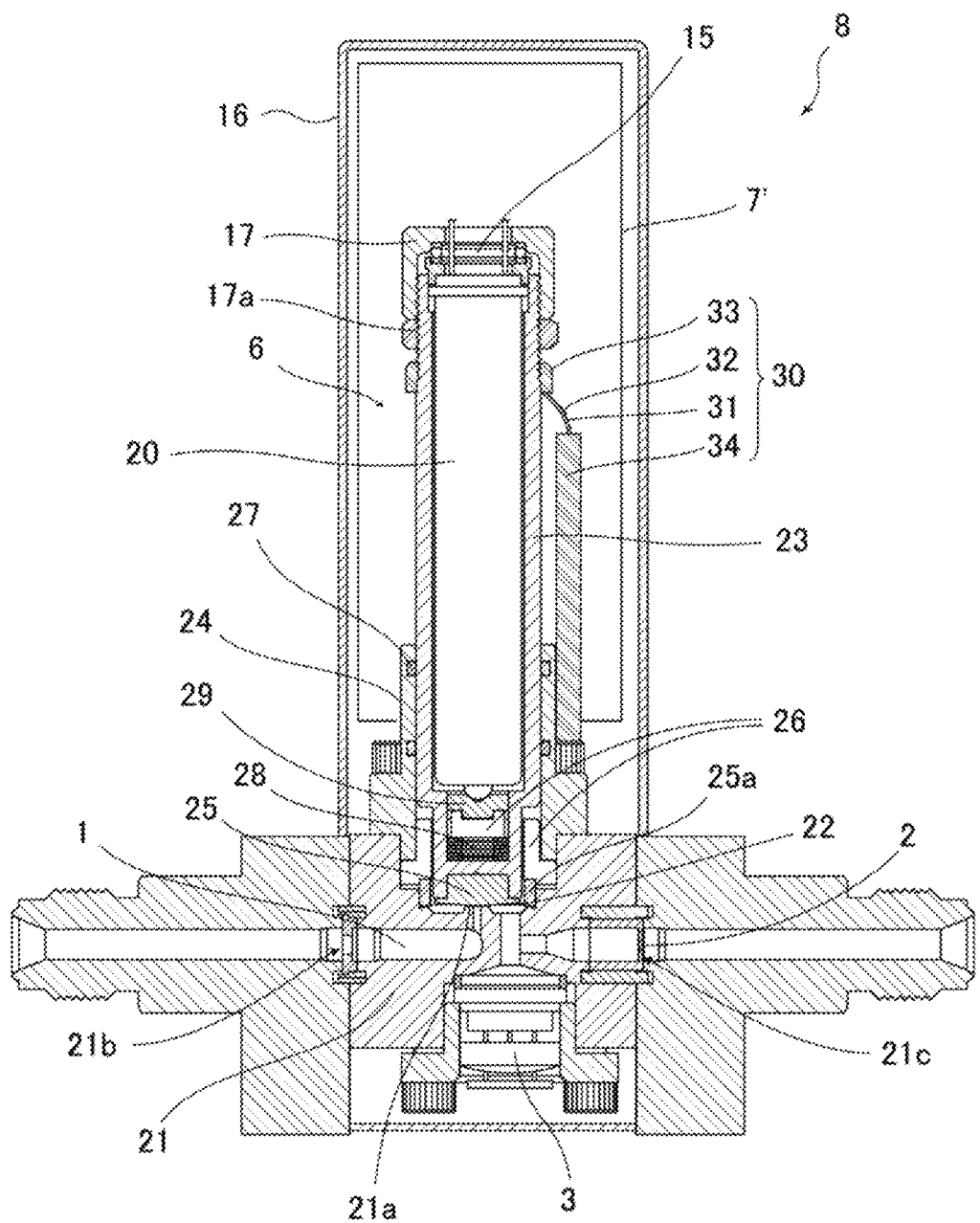
FIG. 2 is a cross-sectional view showing a piezoelectric-element-driven valve according to an embodiment of the present invention.

FIG. 2 is a cross-sectional view showing the configuration of the control valve 6. The control valve 6 is a normally closed type piezoelectric-element-driven valve that performs an opening/closing operation of the valving element 22 using the piezoelectric element 20, and is configured so that the opening degree of the valve can be increased by increasing the driving voltage applied to the piezoelectric element 20.

As shown in FIG. 2, the control valve 6 includes a valve body 21 provided with a flow path 1, a valve seat 21a provided along the flow path 1 and a valving element 22 detachably disposed in the valve seat (i.e., attached to and detached form the valve seat), a valving element presser 25 in contact with the valving element 22, a piezo element 20, and a support cylinder 23 for accommodating the piezo element 20. The piezoelectric element 20 and the support cylinder 23 are disposed in the protective case 16 together with the control circuit board 7'. In the present embodiment, the valving element presser 25 is fixed to the distal end of the support cylinder 23, and moves integrally with the support cylinder 23.

Figure 12:
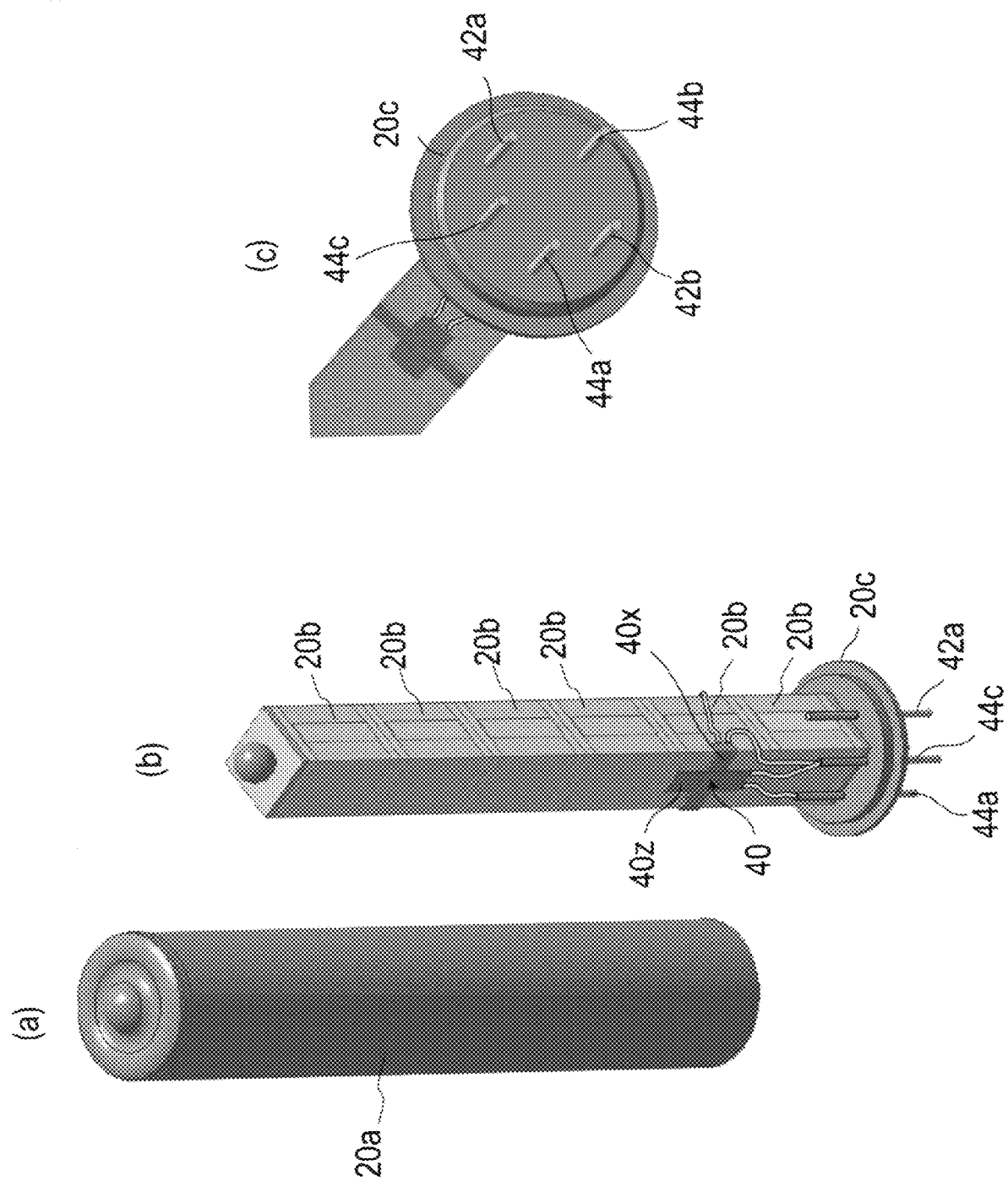
FIG. 12 is a perspective view showing a piezoelectric actuator used in an embodiment of the present invention, wherein (a) shows a cylinder, (b) shows a plurality of piezoelectric elements housed therein, and (c) shows a connector portion.

In the control valve 6, a drive voltage controlled by an arithmetic processing circuit 7 (see FIG. 1) provided on the control circuit board 7' is applied to the piezoelectric element 20 via a connector 15, and the piezoelectric element 20 extends in accordance with the magnitude of the drive voltage. As the piezoelectric element 20, a plurality of piezoelectric elements (also referred to as piezoelectric stacks) stacked as shown in FIG. 12 (to be described later) can be used. A piezoelectric actuator in which one or a plurality of piezoelectric elements 20 are sealed in a metal case is known, and a piezoelectric actuator, for example, sold by NTK CERATECH CORPORATION can be used. Hereinafter, one or more piezoelectric elements 20 housed in a metal case may be referred to as piezoelectric actuators 20.

The valve body 21 is made of stainless steel, and includes a hole portion forming a part of a valve chamber, a fluid inlet, a fluid outlet, a flow path, a valve chamber, a valve seat 21a, and the like. In the present embodiment, the inlet coupling and the outlet coupling are respectively connected to both sides of the valve body 21 via the primary connection portion 21b and the orifice attachment portion 21c. The primary connection portion 21b may be composed of, for example, a connection guide or a gasket, and the orifice attachment portion 21c may be composed of an orifice plate, an orifice guide, a gasket, and the like as the restriction part 2 shown in FIG. 1.

In the embodiment shown in FIG. 2, the first pressure sensor 3 shown in FIG. 1 is attached to the lower surface side of the valve body 21. However, the present invention is not limited to this configuration, and the first pressure sensor 3 may be attached to the upper surface side of the valve body 21. Although not shown in FIG. 2, the second pressure sensor 4 may be provided downstream side of the orifice attachment portion 21c.

The valving element 22 in the present embodiment is a self-elastic return type of metal diaphragm. The metal diaphragm is formed of a thin plate of nickel-chromium alloy steel or the like, for example, and has an inverted dish shape with a central portion slightly bulging upward. The shape of the metal diaphragm may also be flat, and the material may also be stainless steel, inconel alloy, or other alloy steel. The valving element 22 may be comprised of one metal diaphragm, or may also be comprised of two or three laminated metal diaphragms.

The valving element 22, which is a metal diaphragm, is disposed in the valve chamber so as to face the valve seat 21a. The outer peripheral edge of the valving element 22 is fixed to the side of the valve body 21 in an air-tight manner by tightening the mounting bolt to the valve body 21 with a holding adaptor 25a, a split base 26 and a guide member 24 interposed therebetween. The holding adaptor 25a, the guide member 24, the split base 26, and the like may be made of metal such as stainless steel.

The guide member 24 is a hollow member provided so as to cover the lower portion of the support cylinder 23, and is fixed to the valve body 21 by a fixing member such as a screw. The guide member 24 can support the support cylinder 23 and regulate the moving direction of the support cylinder 23. An O-ring 27 is provided between the guide member 24 and the support cylinder 23.

FIG. 3(a) is a longitudinal cross-sectional view of the support cylinder 23, and FIG. 3(b) is a cross-sectional view taken along line A-A of FIG. 3(a). The support cylinder 23 is formed in a cylindrical shape by an invar material having a small thermal expansion coefficient, for example, and has a large diameter portion 23c for accommodating the piezoelectric elements or the piezoelectric actuator 20, and a reduced diameter portion 23d for accommodating a lower pedestal 29, a elastic member 28, and the like, as shown in FIG. 3(a). A fitting portion 23e for fitting the valving element presser 25 is formed at the lowermost end portion of the support cylinder 23. In the present embodiment, the fitting portion 23e is a recess into which the valving element presser 25 is inserted and fixed, but is not limited to this, and may have various modes as long as the valving element presser 25 can be fixed. In addition, the support cylinder 23 and the valving element presser 25 may be integrally provided.

Figure 4:
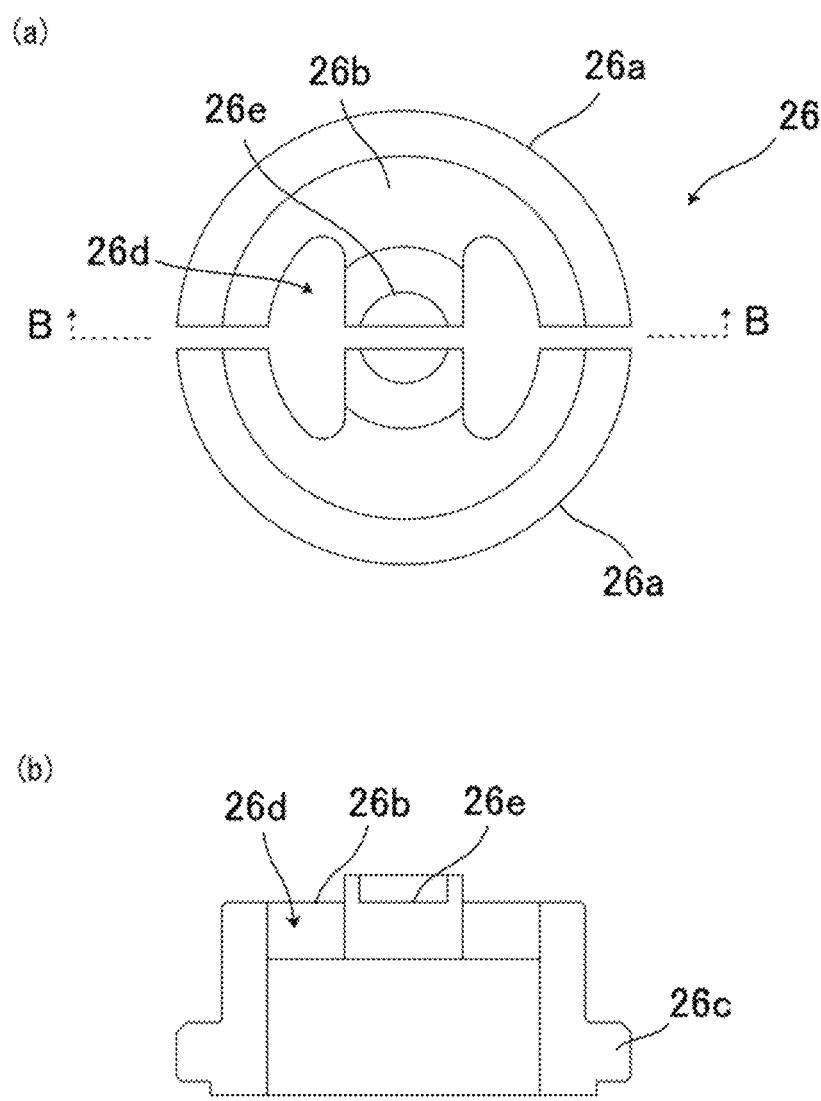
FIG. 4 shows the split base of the valve shown in FIG. 2, (a) is a plan view and (b) is a side view along line B-B of (a).

In the vicinity of the boundary between the large diameter portion 23c and the reduced diameter portion 23d of the support cylinder 23, a pair of hole portions 23a arranged so as to face each other with the center axis of the support cylinder 23 interposed therebetween are provided. A pair of split base pieces 26a shown in FIGS. 4(a) and 4(b) are inserted into the hole portion 23a oppositely from both sides. A part of the inserted split base piece 26a is combined inside the support cylinder 23, and the combined split base piece 26a is integrally held and fixed by the guide member 24 as the split base 26. Before assembling the split base piece 26a, the elastic member 28 shown in FIG. 2 is inserted in advance into a bottom portion 23b provided in the reduced diameter portion 23d.

FIG. 4(a) is a plan view showing the split base 26, and FIG. 4(b) is a cross-sectional view taken along line B-B of FIG. 4(a). As can be seen from FIGS. 4(a) and (b), the split base 26 has a shape in which, when a pair of split base pieces 26a are combined, a flange 26c is formed on the lower outer periphery of the short cylinder with an upper wall 26b. The upper wall 26b is provided with an insertion hole 26d, and the reduced diameter portion 23d of the support cylinder 23 is disposed so as to penetrate the insertion hole 26d. A fitting portion 26e for supporting the lower pedestal 29 is formed in a center portion of the upper wall 26b.

As shown in FIG. 2, the flange of the split base 26 receives a pressing force from the lower end of the guide member 24 to press the pressing adaptor 25a. The insertion hole 26d allows the wall of the reduced diameter portion 23d of the support cylinder 23 (the portion between the pair of hole portions 23a) to be inserted therethrough, and enables the split base 26 to be assembled from the outside of the support cylinder 23.

To explain the procedure of assembling the control valve 6, first, a valving element 22, which is a metal diaphragm, a pressing adaptor 25a, a support cylinder 23 to which the valving element presser 25 is fixed, an elastic member 28, and a split base 26 are assembled in this order into an attachment recess provided in the valve body 21 (attachment recess in which the valve seat 21a is formed), and the support cylinder 23 is inserted into the valve body 21 via the guide member 24. Next, a lower pedestal 29, a ball, or a hemisphere, a piezoelectric actuator 20, and the like are inserted into the support cylinder 23, and the amount of tightening of a cap nut 17, which is a positioning member, is adjusted to finely adjust the operating stroke of the valving element 22 by the piezoelectric actuator 20 to a set value. The position of the cap nut 17 after the adjustment can be maintained by a lock nut 17 a.

In the control valve 6 described above, a hemispherical body contacting the lower surface of the piezoelectric actuator 20 is provided, and the hemispherical body is supported by the lower pedestal 29. The lower pedestal 29 is supported by the split base 26 shown in FIGS. 4(a) and (b), and the split base 26 is fixed to the valve body 21 by the guide member 24. That is, the lower surface of the piezoelectric actuator 20 is supported by the lower pedestal 29 which is immovable with respect to the valve body 21. In the example shown in FIG. 2, although a hemisphere formed separately is interposed between the lower pedestal 29 and the piezoelectric actuator 20, a protrusion having a spherical tip at the center of the lower end surface of the piezoelectric actuator 20 is integrally formed, and this protrusion may be configured as a hemisphere to be in contact with the lower pedestal 29.

In this configuration, when a valve opening signal is input from the arithmetic and control circuit 7 via the connector 15 provided in the upper portion (for example, an input voltage of 0 to 120 V), the piezoelectric actuator 20 extends by a set value (for example, 0 to 45 μm). Thus, for example, a pushing-up force of about 40 to 80 kgf acts on the support cylinder 23, and the support cylinder 23 rises by the above-mentioned set value against the elastic force of the elastic member 28 in a state in which an axis is held by the O-ring 27 of the guide member 24. As a result, the pressing force from the valving element presser 25 to the valving element 22 is lowered, and the valving element 22 is separated from the valve seat 21a by its own elastic force, and the valve is opened. As the elastic member 28, for example, a stack of Belleville springs can be used.

When the valve opening input is turned off, the piezoelectric actuator 20 returns to the original length dimension, and as a result, the bottom portion of the support cylinder 23 of the piezoelectric actuator 20 is pushed downward by the elastic force of the elastic member 28, and the valving element 22 is contacted to the valve seat 21a by the valving element presser 25, and the valve is closed.

As can be understood from the above description, in the control valve 6 of the present embodiment, the support cylinder 23 moves when a voltage is applied to the piezoelectric element 20 or the piezoelectric actuator 20, and the valve is opened when the force applied to the valving element 22 from the valving element presser 25 connected to the support cylinder 23 is lowered. Therefore, in the present embodiment, a detection mechanism for detecting the extension amount of the piezoelectric element 20 or the stroke of the piezoelectric actuator 20, (more specifically, a movement amount detection mechanism 30 for detecting the movement amount of the support cylinder 23) is provided, and the opening degree of the valving element 22 is determined from the movement amount of the support cylinder 23 detected by the movement amount detection mechanism 30.

Hereinafter, the movement amount detecting mechanism 30 used for detecting the extension amount of the piezoelectric element 20 and the opening degree (movement amount) of the valving element 22 will be described in detail.

Figure 5:
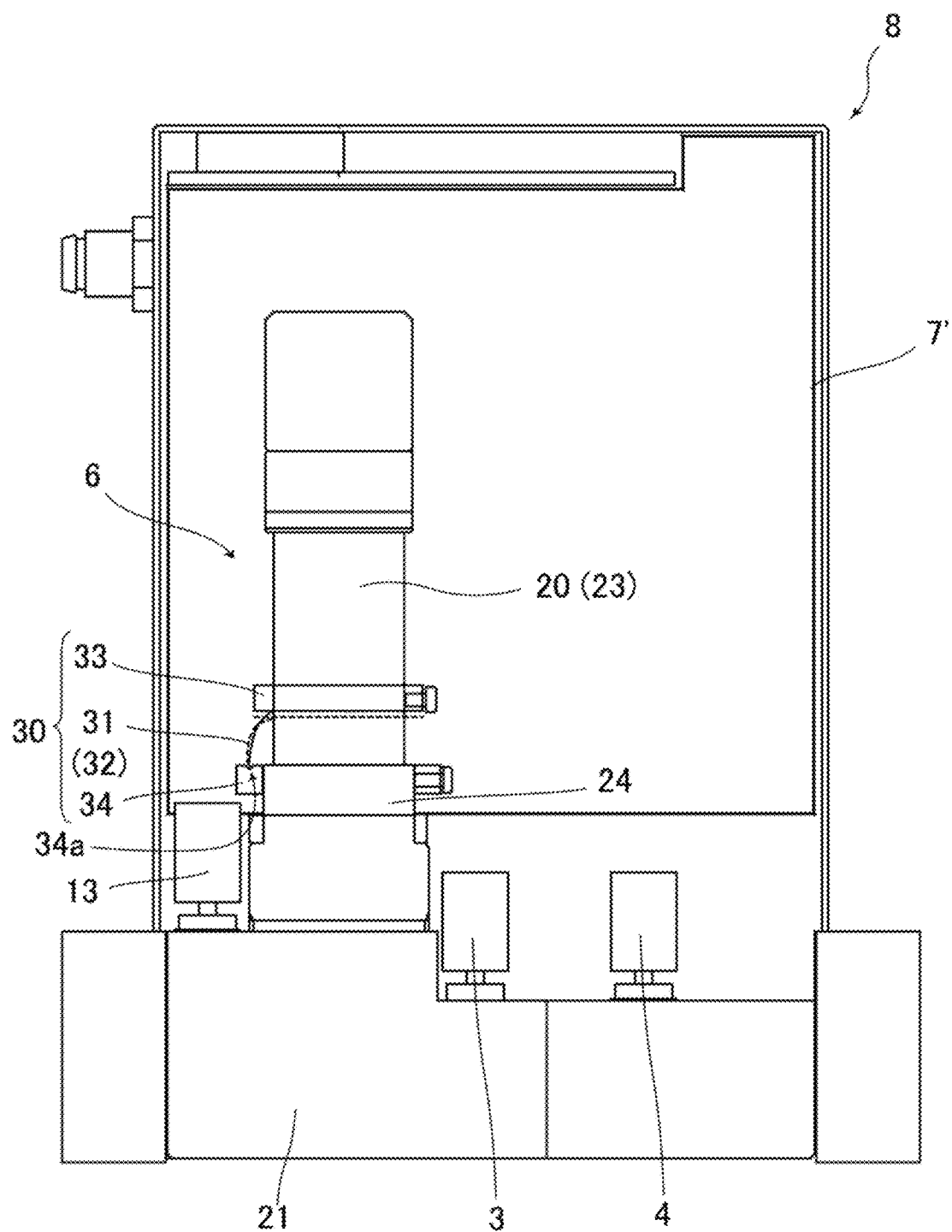
FIG. 5 is a schematic diagram showing a piezoelectric-element-driven valve according to an embodiment of the present invention.

As shown in FIG. 2 and FIG. 5, the movement amount detecting mechanism 30 of the present embodiment is configured by using a leaf spring member 31 and a strain sensor (sometimes referred to as a strain gauge) 32 attached to the leaf spring member 31. The leaf spring member 31 and the strain sensor 32 are preferably arranged so as to overlap with the valve body 21, (i.e., above and inside the valve body 21 in the width direction), thereby preventing the size of the flow rate control device 8 in the width direction from becoming large.

The leaf spring member 31 is provided as a metal beam, and is deformable in accordance with a force applied to both ends of the leaf spring member 31. The upper end of the leaf spring member 31 is disposed so as to come into contact with, for example, the support cylinder 23 or a holding member 33 fixed to the piezoelectric actuator 20, and the holding member 33 moves together with the support cylinder 23 by the extension of the piezoelectric element 20. As shown in FIG. 2, the holding member 33 may be provided on the upper portion of the support cylinder 23, or as shown in FIG. 5, may be a member separately fixed to the lower portion of the support cylinder 23.

The lower end of the leaf spring member 31 is supported by a support member 34 fixed to the valve body 21. The support member 34 may have a recess 34a on its upper surface for receiving the lower end of the leaf spring member 31. The recess 34a is typically formed as a linear recess so as to appropriately support the lower end of the leaf spring member 31.

The support member 34 may be made in various modes, for example a member fixed to the lower end of the leaf spring member 31. The support member 34 may also be a member formed integrally with the valve body 21 or the guide member 24, (such as the guide member 24 itself).

The size and shape of the leaf spring member 31 may be arbitrary, but, for example, the width is 2 mm to 15 mm, the length is 3 mm to 20 mm, and the thickness is 0.2 mm to 2 mm. The leaf spring member 31 may be formed of various metallic materials, for example, stainless steel, spring steel, brass, phosphor bronze, beryllium steel, titanium steel, and the like. The longitudinal elastic modulus (Young's modulus) of the leaf spring member 31 at room temperature is set to, for example, $80 \times 10^3$ N/mm$^2$ to $210 \times 10^3$ N/mm$^2$.

A strain sensor 32 is fixed to the center portion of the leaf spring member 31. As the strain sensor 32, a KFR-02 N manufactured by KYOUWA ELECTRICAL CONSTRUCTION Ltd. can be used for example. The strain sensor 32 is attached to the leaf spring member 31 by, for example, an adhesive or the like, and the magnitude of the strain generated in the leaf spring member 31 can be detected as a change in the electric resistance of the strain sensor 32.

The leaf spring member 31 may be mounted in various modes as long as deformation is possible in response to movement of the piezoelectric actuator 20. For example, the upper end of the leaf spring member 31 may be fixed to the upper end of the piezoelectric actuator 20 by any means, and the lower end thereof may be supported by the upper end surface of the guide member 24. Also, both the upper end and the lower end of the leaf spring member 31 may be fixed.

In the control valve 6 of the present embodiment, a strain sensor having the same configuration as the strain sensor 32 attached to the leaf spring member 31 may be provided as a reference strain sensor on a leaf member having the same material and shape as the leaf spring member 31. However, the reference strain sensor is attached to a leaf material which is not distorted by the movement of the support cylinder 23, and is provided to compensate for an output of the strain sensor which may vary due to a temperature change or the like. Specifically, by reading a change in the output of the reference strain sensor as a change in the background, and subtracting the amount of the change from an output of the strain sensor 32, it is possible to compensate for a change due to temperature change or the like.

Alternatively, in the control valve 6 of the present embodiment, a strain sensor having the same configuration as that of the strain sensor attached to the leaf spring member 31 is also attached to the surface on the opposite side of the leaf spring member 31, by employing the 2-gauge method, it is also possible to compensate for a variation due to temperature change or the like.

In the movement amount detecting mechanism 30 configured as described above, the movement amount of the support cylinder 23, (i.e. the extension amount of the piezoelectric element 20), can be detected from the output of the strain sensor 32. FIG. 5 shows a state in which when a holding member 33 fixed to the piezoelectric actuator 20 moves to a position indicated by the broken line on the lower side, the leaf spring member 31 deforms as indicated by the broken line, and as a result, the output of the strain sensor 32 changes.

The actual valve opening degree can be detected according to the movement amount of the support cylinder 23 obtained from the output of the strain sensor 32. Therefore, it is possible to more accurately detect the valve opening degree as compared with the case of estimating the valve opening degree from the drive voltage of the piezoelectric element 20.

Hereinafter, a test result of examining the relationship between the output of the strain sensor attached to the leaf spring member 31 and the degree of extension of the piezoelectric element will be described.

Figure 6:
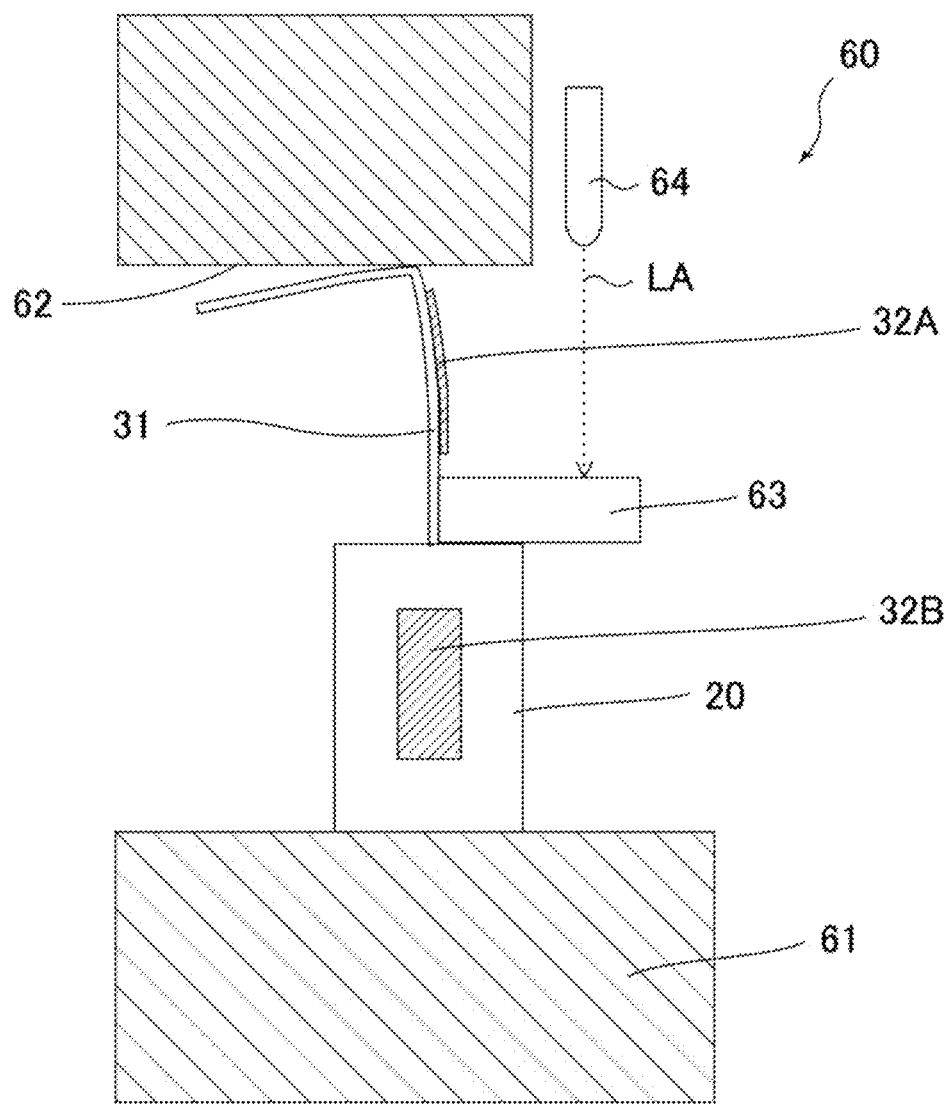
FIG. 6 is a diagram showing a test apparatus used for examining the relationship between the extension degree of the piezoelectric element and the output of the strain sensor.

FIG. 6 shows a configuration of a test apparatus 60. In the test apparatus 60, the piezoelectric element 20 is fixed to the upper surface of a table 61, the lower end of the leaf spring member 31 is arranged on the upper surface of the piezoelectric element 20, and the upper end of the leaf spring member 31 is brought into contact with a fixed surface 62, whereby the leaf spring member 31 is curved in accordance with the degree of extension of the piezoelectric element 20. A first strain sensor 32A is attached to the leaf spring member 31, and the first strain sensor 32A detects the curvature (or applied stress) of the leaf spring member. The size of the piezoelectric element used in the test was 10.8 mm in length×10.8 mm in width×18.0 mm in height.

Further, in the test apparatus 60, a strain sensor 32B is also attached directly to the piezoelectric element 20 itself, and the test is simultaneously performed as to whether or not the extension amount of the piezoelectric element 20 can be detected by the second strain sensor 32B.

Moreover, in the test apparatus 60, in order to optically measure the extension degree of the piezoelectric element 20 in the height direction, a laser displacement meter 64 configured to irradiate a reflection member 63 fixed to the piezoelectric element 20 with a laser beam LA is separately provided. The extension of the piezoelectric elements 20 by the laser displacement meter 64 is optically measured by detecting the laser light reflected by the reflecting member 63 with a CMOS image sensor or the like.

Figure 7:
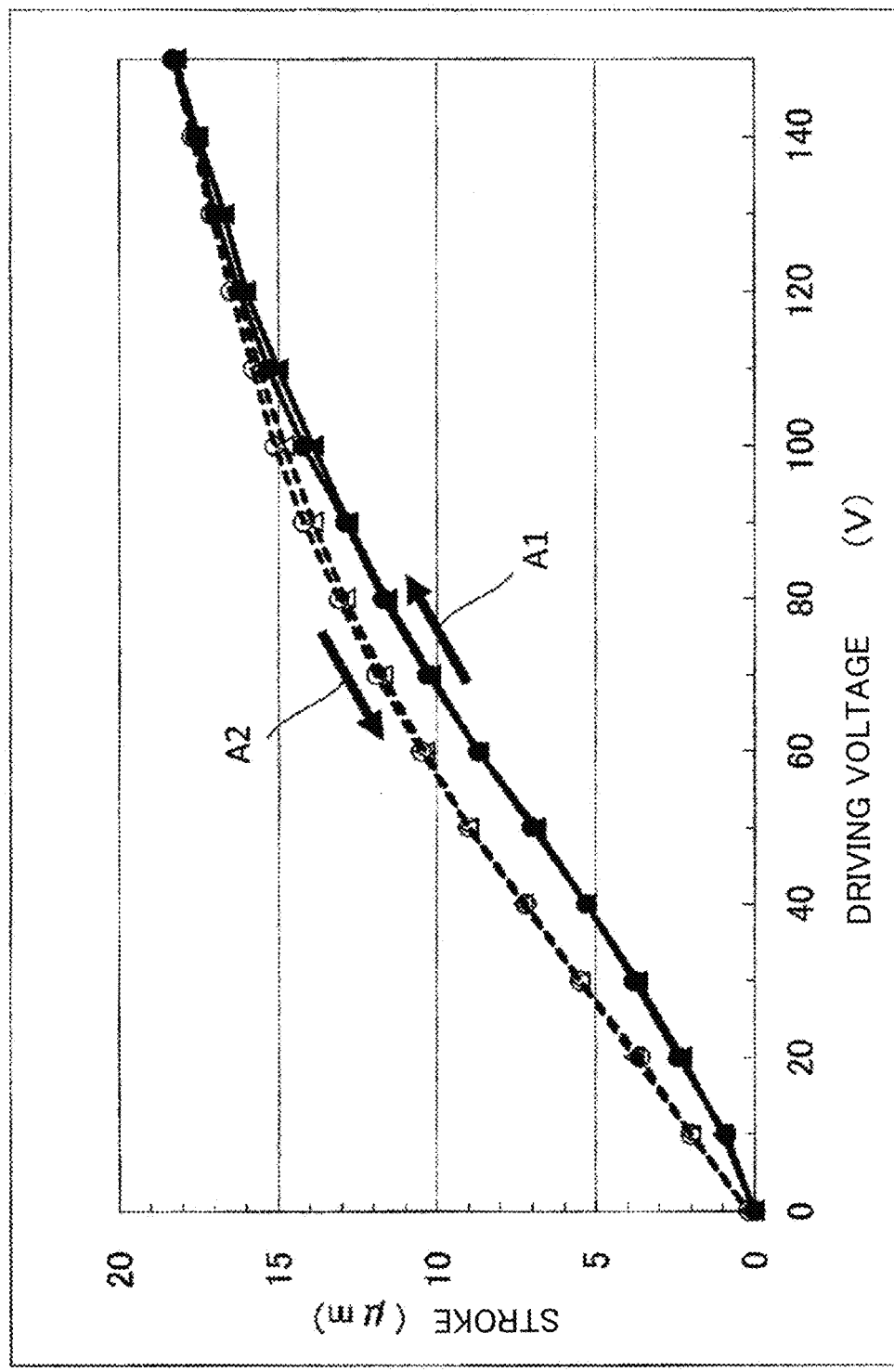
FIG. 7 is a graph showing the relationship between the driving voltage of the piezoelectric element and the extension degree (stroke of the piezoelectric actuator) of the piezoelectric element.
Figure 8:
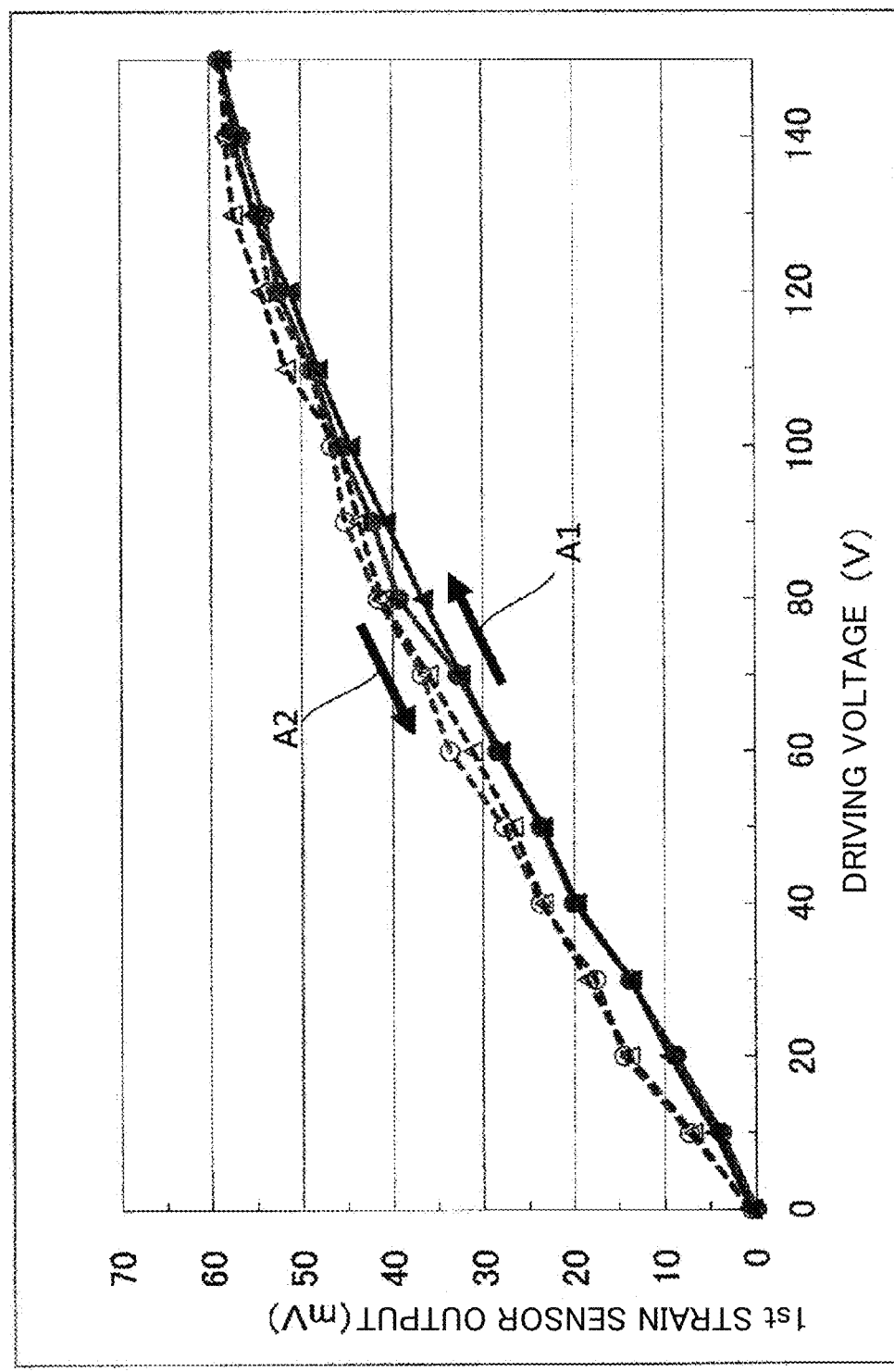
FIG. 8 is a graph showing the relationship between the driving voltage of the piezoelectric element and the output of the strain sensor attached to the leaf spring member.
Figure 9:
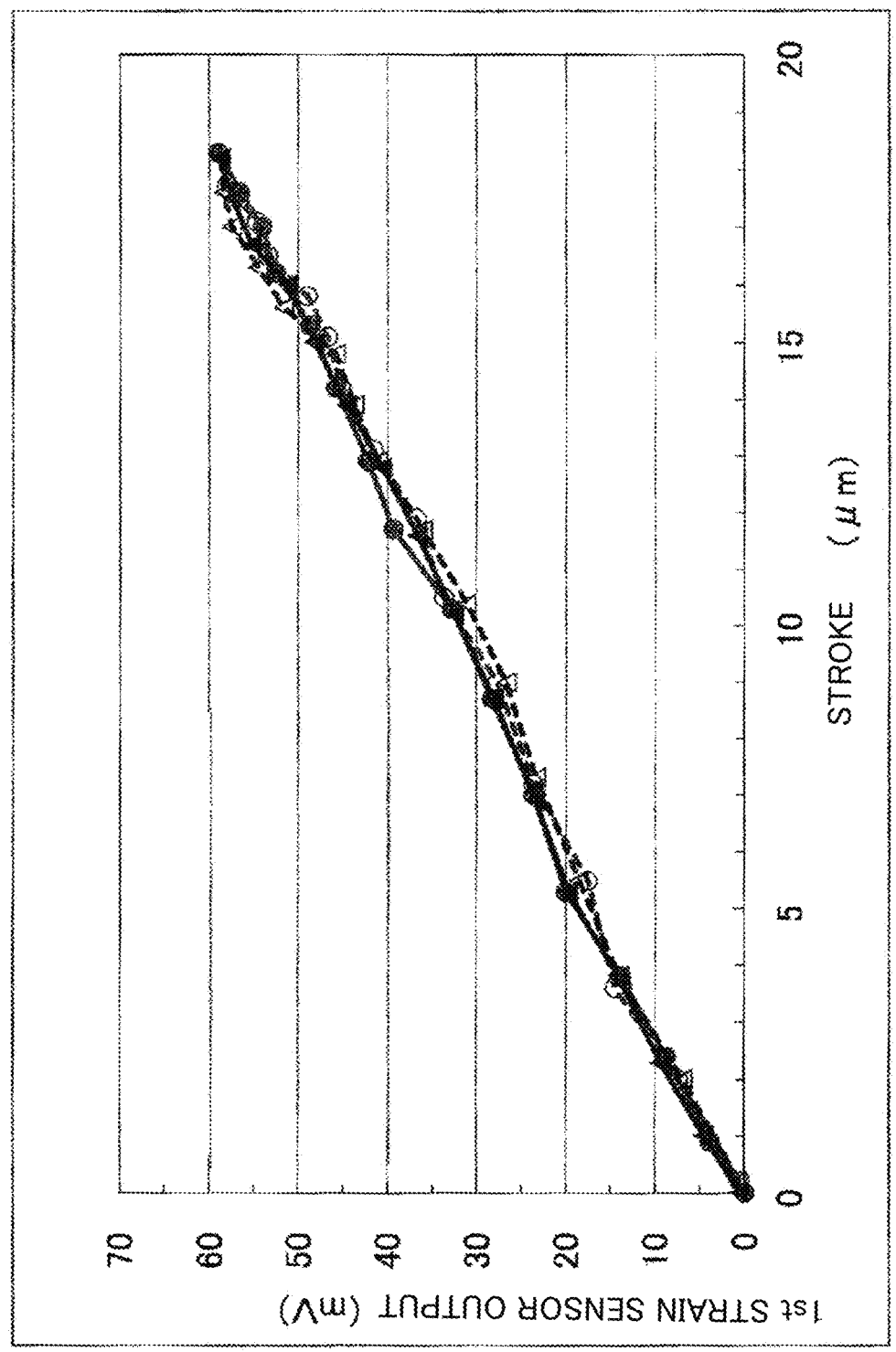
FIG. 9 is a graph showing the relationship between the extension degree of the piezoelectric element (stroke of the piezoelectric actuator) and the output of the strain sensor attached to the leaf spring member.

FIG. 7 shows the relationship between the driving voltage of the piezoelectric element 20 and the extension (stroke (μm)) in the height direction of the piezoelectric element 20 measured using the laser displacement meter 64. FIG. 8 shows the relationship between the drive voltage of the piezoelectric element 20 and the output (here, voltage output (mV)) of the first strain sensor 32A attached to the leaf spring member 31. FIG. 9 shows the relationship between the stroke of the piezoelectric element 20 and the output of the first strain sensor 32 A. FIGS. 7 to 9 show measurement data for two times.

As can be seen from FIGS. 7 and 8, when the drive voltage is 0, the output (stroke) of the laser displacement meter 64 is set to 0, and the output of the first strain sensor 32A is also set to 0. Also, as shown by arrows A1 in FIGS. 7 and 8, when the driving voltage applied to the piezoelectric element 20 is increased from 0V to 150V, the stroke of the piezoelectric element 20 is increased, and the output of the first strain sensor 32A attached to the leaf spring member 31 is also increased. Also, as shown in FIGS. 7 and 8 by the inverted arrow A2, it can be seen that when the drive voltage is decreased from 150V to 0V, the stroke of the piezoelectric element is decreased, and the output of the first strain sensor 32A is also decreased in a similar manner.

Referring to the relationship between the stroke of the piezoelectric element 20 and the output of the first strain sensor 32A, as shown in FIG. 9, it can be seen that these are generally linear. Therefore, it is possible to detect the extension amount of the piezoelectric element 20 from the output of the first strain sensor 32A attached to the leaf spring member 31.

Figure 10:
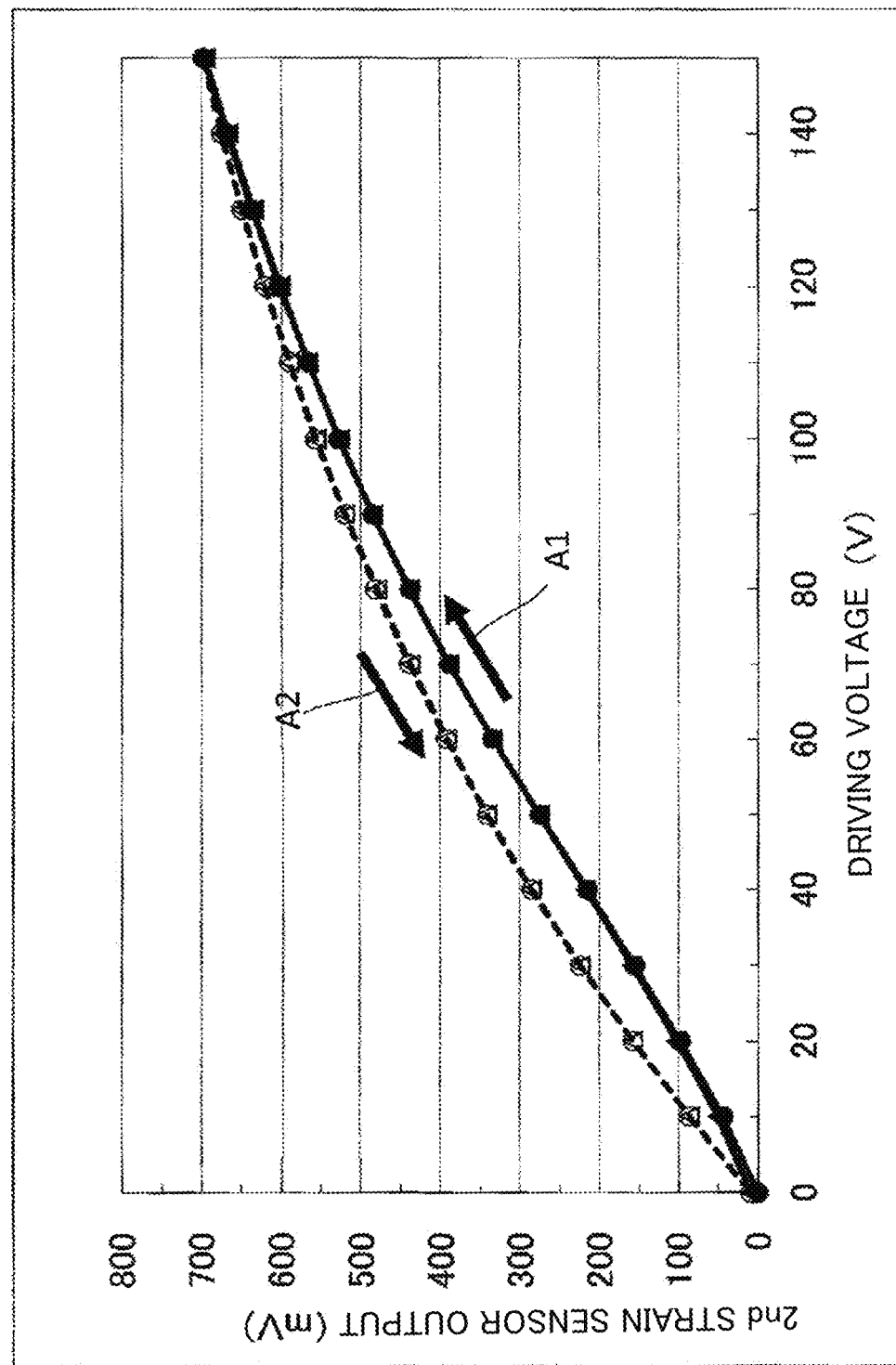
FIG. 10 is a graph showing the relationship between the driving voltage of the piezoelectric element and the output of the strain sensor attached directly to the piezoelectric element.
Figure 11:
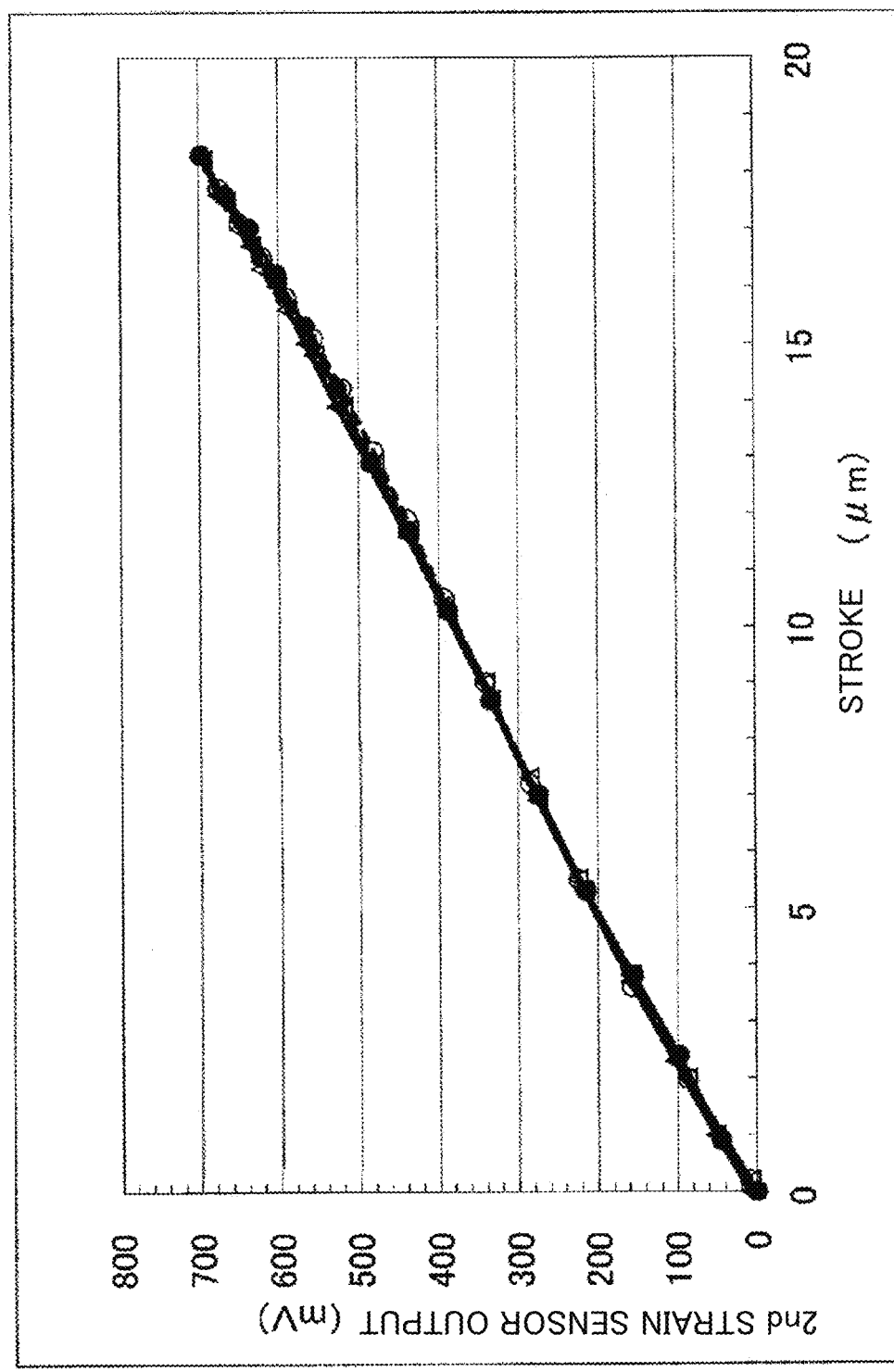
FIG. 11 is a graph showing the relationship between the extension degree of the piezoelectric element (stroke of the piezoelectric actuator) and the output of the strain sensor attached directly to the piezoelectric element.

FIG. 10 shows the relationship between the driving voltage of the piezoelectric element 20 and the output (here, voltage output (mV)) of the second strain sensor 32B directly attached to the piezoelectric element 20. FIG. 11 shows the relationship between the stroke of the piezoelectric element 20 and the output of the second strain sensor 32B. FIG. 10 and FIG. 11 show measurement data for two times.

As shown in FIG. 10, the output of the second strain sensor 32 B also increases or decreases in accordance with the drive voltage of the piezoelectric element 20, similarly to the output of the first strain sensor 32A (FIG. 8). As shown in FIG. 11, referring to the relationship between the stroke of the piezoelectric element 20 and the output of the second strain sensor 32B, it can be seen that these are substantially linear. Therefore, it is understood that the extension amount of the piezoelectric element 20 can be detected from the output of the second strain sensor 32B directly attached to the piezoelectric element 20.

From the above results, it has been found that, as the extension detection mechanism of the piezoelectric element 20, if the first strain sensor 32A fixed to the leaf spring member 31 attached so that the degree of curvature (degree of deformation) and the stress change simultaneously with the movement of the support cylinder 23 corresponding to the extension of the piezoelectric element 20, or the second strain sensor 32B directly fixed to the piezoelectric element 20 is used, the extension of the piezoelectric element 20 (or the movement amount of the support cylinder 23) can be accurately measured, and therefore, the opening/closing degree of the valve can be accurately detected.

Note that, in a case where the relationship between the output of the strain sensor and the movement amount of the piezoelectric actuator is not linear, or the like, a conversion table between the output of the strain sensor and the displacement of the piezoelectric actuator may be prepared in advance. The conversion table is stored in advance in a storage device such as a memory provided in the arithmetic processing circuit 7, for example, and when the movement amount of the piezoelectric actuator is detected, the conversion table is read out, and the opening degree of the valve can be detected from the output of the strain sensor using the conversion table.

In the specification of the present application, the output of the strain sensor means various outputs corresponding to the resistance value of the strain gauge which changes according to the strain amount of the strain gauge constituting the strain sensor, and may be, for example, the resistance value itself of the strain gauge, or a bridge output signal (see FIG. 13) output from a Wheatstone bridge circuit incorporating a plurality of strain gauges. The output of the strain sensor obtained in either mode corresponds to the extension amount of the piezoelectric element, the extension amount of the piezoelectric element and the movement amount of the valve body can be known according to the output of the strain sensor.

As described above, in the control valve 6 of the present embodiment, since the detection mechanism (for example, the movement amount detection mechanism 30 for detecting the movement amount of the support cylinder 23 and the strain sensor 32 directly attached to the side surface of the piezoelectric element 20) is provided, and the extension amount of the piezoelectric element 20 is directly measured by the strain sensor 32, it is possible to detect the opening/closing degree of the valving element 22 with higher accuracy than in the case of estimating the extension amount from the drive voltage or the like.

If the opening/closing degree of the valving element 22 can be detected with high accuracy in this manner, it is possible to detect the opening/closing degree with high accuracy even when the gas pressure on the upstream side or the like fluctuates. Then, the measured extension amount of the piezoelectric element 20 is monitored, and compared with the normal state, when an abnormal tendency is observed, for example, when the extension amount in the fully open state falls below a preset threshold value, or when the extension amount does not reach a predetermined value despite the supply of the drive voltage to the piezoelectric actuator, it is determined that an abnormality has occurred in the piezoelectric actuator (i.e., the use limit has been reached), and the control valve 6 or the internal piezoelectric actuator is replaced. This allows the piezoelectric actuator to be replaced before complete failure, and avoids the occurrence of significant losses with the use of a failed valve.

Further, since the movement amount of the piezoelectric actuator can be accurately measured, the piezoelectric-element-driven valve having the same configuration as that of the control valve 6 configured as described above can be used as a variable orifice device, for example, in addition to being used as a valve for pressure control. In the specification of the present application, the variable orifice device is a device such as an orifice member in which an opening narrowed in a flow path through which a fluid passes is provided, and means various devices which are configured to be able to change an opening degree (a cross-sectional area of the flow path) in the opening. Instead of the orifice member, the variable orifice device may include a valve mechanism with an adjustable opening degree.

When a piezoelectric-element-driven valve having the same configuration as that of the control valve 6 is used as a variable orifice device, the opening position can be controlled by detecting the opening degree of the orifice (valve opening degree) by a detecting mechanism (the movement amount detecting mechanism 30 or the strain sensor 32 directly fixed to the piezoelectric element 20) and controlling the driving voltage applied to the piezoelectric element 20. In addition, the flow path cross-sectional area can be obtained from the opening/closing degree of the valving element 22 detected by the detection mechanism. Therefore, the piezoelectric-element-driven valve can be suitably used as a variable orifice device having a desired flow path cross-sectional area.

For example, the restriction part 2 of the flow control device 8 can be configured by a piezoelectric-element-driven valve having the same configuration as the control valve 6. In the flow rate control device 8 configured as described above, the flow rate can be controlled by controlling the control valve disposed upstream of the restriction part 2 so that the upstream pressure $P_1$ detected by the pressure sensor 3 becomes constant, and adjusting the valve opening degree of the piezoelectric-element-driven valve (variable orifice device) provided as the restriction part 2. In addition, the flow rate can be controlled by controlling the upstream pressure $P_1$ by the control valve in the same manner as described above while keeping the opening degree of the piezoelectric-element-driven valve provided as the restriction part 2 constant. Also in this case, it is advantageous to change the flow rate control range by switching the opening degree of the piezoelectric-element-driven valve provided as the variable orifice device. It is needless to say that the above two flow rate control operations may be performed in combination.

Further, for example, Japanese Patent Laid-Open No. H11-265217 discloses a variable orifice device in which a needle valve is controlled by a piezoelectric element. The piezoelectric-element-driven valve according to the embodiment of the present invention can also be applied to such a variable orifice device, and the opening degree of the needle valve can be detected by providing a detection mechanism including a strain sensor. Specifically, the valve opening degree can be accurately detected by providing a detection mechanism composed of a leaf spring member with a fixed strain gauge between a movable portion such as a piezoelectric actuator connected to a valving element presser in contact with a needle valve and a fixed portion such as a valve body.

Exemplary embodiments of a piezoelectric-element-driven valve in which a strain sensor is directly fixed to a piezoelectric element and a flow control device using the same will be described below.

First, a detailed configuration of a piezoelectric actuator constituting the piezoelectric-element-driven valve of the present embodiment will be described. FIG. 12(*a*) shows an outer cylinder 20*a* constituting the piezoelectric actuator; FIG. 12(*b*) shows a plurality of piezoelectric elements 20*b* accommodated in the cylinder 20*a* in a state of being arranged in a line; and FIG. 12(*c*) shows a state when a connector portion 20*c* shown in FIG. 12(*b*) is viewed from the front direction.

As shown in FIG. 12(*b*), in the piezoelectric actuator, a strain sensor 40 is directly attached to one of the plurality of piezoelectric elements 20*b* by an adhesive or the like. The strain sensor 40 is disposed on the side of the piezoelectric element 20*b*, and in this embodiment, is comprised of a longitudinal strain gauge 40*z* for detecting distortion in the laminated direction of the piezoelectric element 20*b*, i.e., in the z direction that is the main extension direction of the piezoelectric element 20*b*, and a lateral strain gauge 40*x* for detecting distortion in the x direction perpendicular to the main extension direction. As the longitudinal strain gauge 40*z* and the lateral strain gauge 40*x*, for example, a KFR-02N, a KFGS-1, a KFGS-3, or the like manufactured by KYOUWA ELECTRICAL CONSTRUCTION Ltd. can be used. In another embodiment, the piezoelectric actuator may be constituted by a single piezoelectric element accommodated in the cylinder and a strain sensor attached to the side surface.

In the present embodiment, the longitudinal strain gauge 40*z* is attached to the side surface of the piezoelectric element so that the whole is in contact with the piezoelectric element, and the lateral strain gauge 40*x* is attached to the piezoelectric element so as to cross the central portion of the longitudinal strain gauge 40*z*. The longitudinal strain gauge 40*z* and the lateral strain gauge 40*x* can detect the extension amount of the piezoelectric element as a change in electrical resistance of the longitudinal strain gauge 40*z* and the lateral strain gauge 40*x*.

As shown in FIG. 12(*c*), the connector portion 20*c* is provided with a pair of drive voltage terminals 42*a* and 42*b* for applying a drive voltage to each of the piezoelectric elements 20*b*, a first strain sensor output terminal 44*a* connected to one terminal of the longitudinal strain gauge 40*z*, a strain sensor common output terminal 44*c* connected in common to the other terminal of the longitudinal strain gauge 40*z* and one terminal of the lateral strain gauge 40*x*, and a second strain sensor output terminal 44*b* connected to the other terminal of the lateral strain gauge 40*x*.

The plurality of piezoelectric elements 20*b* constituting the piezoelectric actuator are electrically connected to the drive voltage terminals 42*a* and 42*b* by a known circuit configuration, and by applying a voltage to the drive voltage terminals 42*a* and 42*b*, all of the piezoelectric elements 20*b* can be extended in the stack direction. As the piezoelectric actuator, for example, a piezoelectric actuator sold by NTK Ceratec Co., Ltd. or the like can be used.

The first and second strain sensor output terminals 44*a* and 44*b* and the strain sensor common output terminal 44*c* are connected to a circuit provided on an external substrate, and a bridge circuit including the longitudinal strain gauge 40*z* and the lateral strain gauge 40*x* is formed. In this bridge circuit, changes in resistance values of the longitudinal strain gauge 40*z* and the lateral strain gauge 40*x* can be detected.

Figure 13:
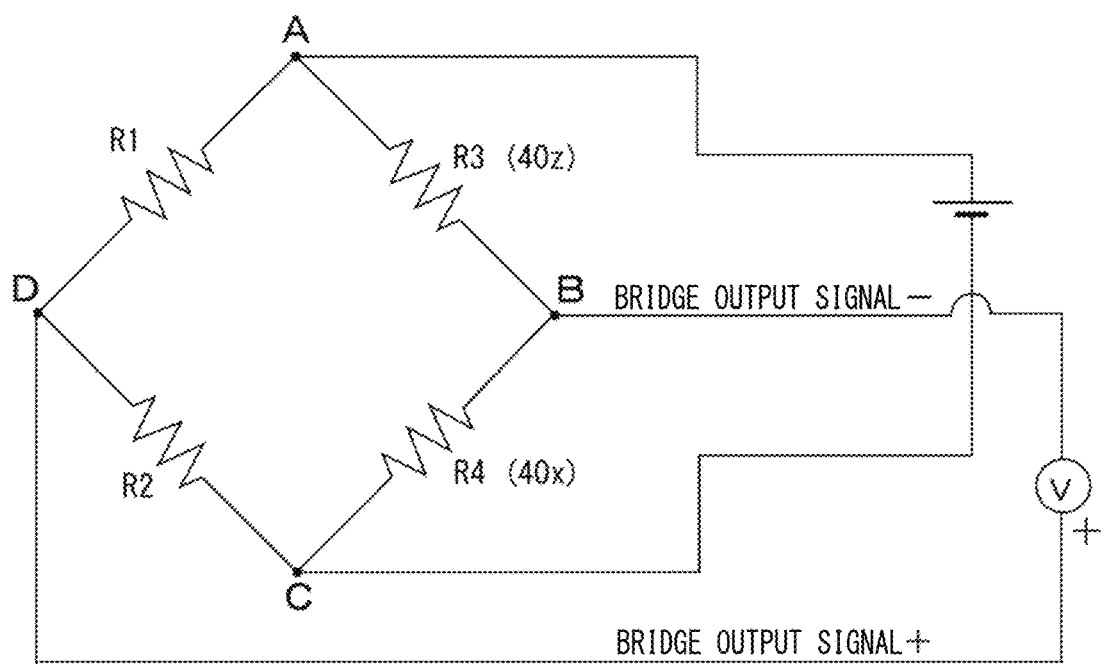
FIG. 13 illustrates an exemplary bridge circuit for obtaining a strain sensor output in an embodiment of the present invention.

FIG. 13 shows an exemplary equivalent circuit for detecting the change in resistance values of the longitudinal strain gauge 40*z* and the lateral strain gauge 40*x*. In the equivalent circuit shown in FIG. 13, resistors R1 and R2 provided between the branch points A and D and between the branch points C and D correspond to fixed resistors of known resistance values provided on the external substrate, a resistor R3 provided between the branch points A and B corresponds to the longitudinal strain gauge 40*z*, and a resistor R4 provided between the branch points B and C corresponds to the lateral strain gauge 40*x*. In the present embodiment, the resistance values of the longitudinal strain gauge 40*z* and the lateral strain gauge 40*x* and the resistance values of the two fixed resistors R1 and R2 are set to be the same, for example, 120 ohms or 350 ohms.

In FIG. 13, the branch point A corresponds to the first strain sensor output terminal 44*a*, the branch point B corresponds to the strain sensor common output terminal 44*c*, and the branch point C corresponds to the second strain sensor output terminal 44*b*. In this equivalent circuit, in a state where a predetermined bridge application voltage is applied between the branch points A and C, a change in the resistance value of the longitudinal strain gauge 40*z* or the lateral strain gauge 40*x* is detected as a change in the bridge output signal (an electric potential difference between the branch points B and D). When the resistors R1 to R4 have the same magnitude as described above, the bridge output signal typically indicates zero in the initial state.

When a driving voltage is applied to the piezoelectric actuator, the piezoelectric element 20*b* to which the strain sensor 40 is attached extends in the z direction, and contracts in the x direction orthogonal thereto in some cases. In this case, the resistance value of the longitudinal strain gauge 40*z* increases corresponding to the extension amount of the piezoelectric element, while the resistance value of the lateral strain gauge 40*x* decreases corresponding to the contraction amount of the piezoelectric element.

In the circuit shown in FIG. 13, when the piezoelectric element extends, the bridge output signal increases because the amount of strain in the longitudinal strain gauge 40*z* increases; and the bridge output signal also increases because the amount of strain in the lateral strain gauge 40*x* decreases. Therefore, at the time of the piezoelectric stack displacement, a variation of the bridge output signal occurs corresponding to the sum of the increase in the amount of strain of the longitudinal strain gauge 40*z* and the decrease in the amount of strain of the lateral strain gauge 40*x*. Thus, the bridge output signal can be amplified.

In addition, by configuring the bridge circuit using the longitudinal strain gauge 40*z* and the lateral strain gauge 40*x* orthogonal thereto as described above, it is possible to compensate for the change in the resistance value of the strain sensor 40 due to the temperature change. This is because, when the piezoelectric element expands due to, for example, an increase in temperature, the expansion acts as an element for increasing the bridge output signal for the longitudinal strain gauge 40*z*, whereas it acts as an element for decreasing the bridge output signal for the lateral strain gauge 40*x*, resulting in a bridge output signal in which the increasing element and the decreasing element due to temperature are offset. Therefore, even when the piezoelectric element itself expands and contracts due to a change in temperature, the influence on the bridge output signal is reduced, and temperature compensation can be realized.

In the flow rate control device 8 having the control valve 6 configured as described above, the opening degree of the control valve 6 can be known according to the output of the strain sensor 40. As a result, it is possible to appropriately detect or predict a malfunction of the control valve 6. It is needless to say that when a piezoelectric-element-driven valve provided with the strain sensor 40 is used as the control valve 6 shown in FIG. 1, the strain sensor 40 and the arithmetic processing circuit 7 may be electrically connected directly. In such a configuration, the arithmetic processing circuit 7 can constantly monitor the opening/closing degree (movement amount of the valving element) of the control valve 6 according to the output of the strain sensor 40.

In addition, as another mode different from the mode shown in FIG. 1, the piezoelectric-element-driven valve to which the strain sensor 40 is attached may be used as a restriction part (variable orifice device) whose opening degree is variable, and the restriction part 2 (for example, an orifice plate) whose opening is fixed as shown in FIG. 1 may not be provided.

Figure 14:
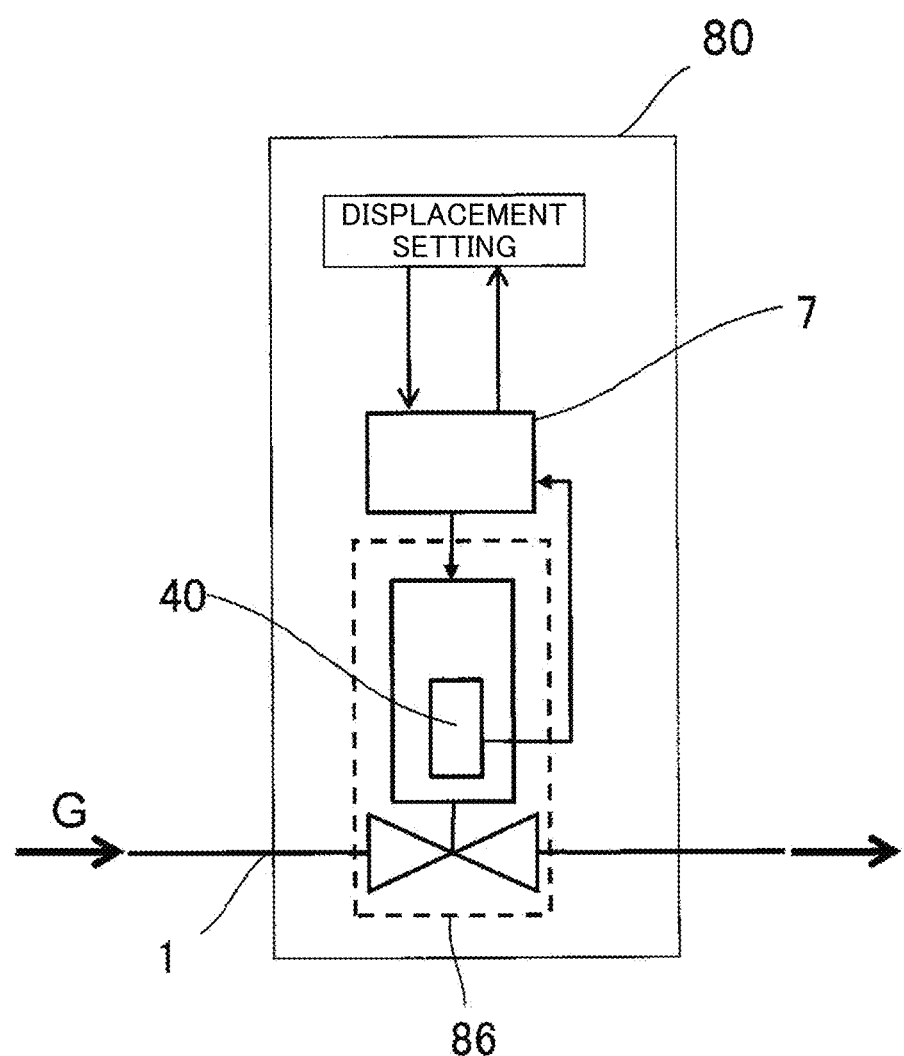
FIG. 14 is a diagram showing a configuration of a flow rate control device in a case where a piezoelectric-element-driven valve provided with a strain sensor is used as a restriction part having a variable opening degree in an embodiment of the present invention.

FIG. 14 shows a flow control device 80 configured to perform flow rate control using a piezoelectric-element-driven valve 86 with the strain sensor 40 fixed to the piezoelectric element. In the flow rate control device 80, the output of the strain sensor 40 is sent to the arithmetic processing circuit 7 in order to measure the movement amount of the valving element of the piezoelectric-element-driven valve 86. According to the output of the strain sensor 40, the arithmetic processing circuit 7 can feedback-control the driving of the piezoelectric-element-driven valve 86 so as to coincide with the input displacement setting, i.e. (the set value of the stroke of the piezoelectric actuator). In this manner, the piezoelectric-element-driven valve 86 can be controlled to a valve opening degree suitable for a desired set flow rate according to the output of the strain sensor 40.

As described above, when the piezoelectric-element-driven valve 86 is feedback-controlled in accordance with the output of the strain sensor 40, a higher-speed response can be realized as compared with the conventional system in which the feedback control is performed in accordance with the output of a pressure sensor. Thus, the piezoelectric-element-driven valve 86 may be utilized as a high speed servo control valve. In addition, in the flow rate control device 80, since it is unnecessary to provide a restriction part having a fixed opening degree, it is possible to simplify and miniaturize the device.

Although not shown in the drawing, in the flow rate control device 80, a pressure sensor and a pressure regulating valve may be provided upstream of the piezoelectric-element-driven valve 86, and the upstream pressure of the piezoelectric-element-driven valve 86 may be kept constant in the range of 50 kPa to 300 kPa, for example. As a result, the flow rate control by the opening degree control of the piezoelectric-element-driven valve 86 can be performed more stably.

While embodiments of the present invention have been described above, various modifications are possible. For example, although a pressure control type flow rate control device has been described in the above embodiment, the present invention is also applicable to a control method other than the pressure control type, for example, a thermal type flow rate control device that controls the flow rate using a thermal type sensor. Further, in the above embodiment, the piezoelectric-element-driven valve provided with a self-elastically elastic return type metal diaphragm valving element has been described, but it is obvious to a person skilled in the art that the present invention is also applicable to a valving element other than the metal diaphragm.

In addition, the piezoelectric-element-driven valve according to the embodiments of the present invention may be of a normally open type, and in this case, for example, the movement amount of the valving element, i.e. the opening degree of the valve, can be known with high accuracy by measuring the movement amount of the support cylinder moving downward with respect to the valve body due to the extension of the piezoelectric element by a detection mechanism including a strain sensor. Of course, in the normally open type piezoelectric-driven valve, the strain sensor may be attached directly to the piezoelectric element to measure the movement amount of the valving element, i.e., the opening degree of the valve.

INDUSTRIAL APPLICABILITY

The piezoelectric-element-driven valve according to the embodiments of the present invention is preferably used particularly in a flow rate control device, and can be suitably used for detecting an actual opening/closing degree of the valve.

DESCRIPTION OF NUMERICALS

1 Flow path
2 Restriction part
3 First pressure sensor
4 Second pressure sensor
5 Temperature sensor
6 Control valve
7 Arithmetic processing circuit
8 Flow rate control device
9 Downstream valve
10 Process chamber
11 Vacuum pump
12 External device
20 Piezoelectric element (piezoelectric actuator)
21 Valve body
21a Valve seat
22 Valving element
23 Support cylinder
24 Guide member
25 Valving element presser
26 Split base
27 O-ring
28 Elastic member
29 Bottom pedestal
30 Movement amount detection mechanism (piezoelectric element extension amount detection mechanism)
31 Leaf spring member
32 Strain sensor
33 Retaining member
34 Supporting member
40 Strain sensor
40x lateral strain gauge
40z longitudinal strain gauge

The invention claimed is:
1. A piezoelectric-element-driven valve comprising:
a valve seat provided in a flow path and a valving element detachably seated on the valve seat;
a piezoelectric element; and
a detection mechanism including a strain sensor for detecting an extension amount of the piezoelectric element,
wherein the piezoelectric-element-driven valve is configured to move the valving element by extension of the piezoelectric element; and a movement amount of the valving element is determined according to an output of the strain sensor,
wherein the strain sensor is directly fixed to a side surface of the piezoelectric element and the strain sensor includes a longitudinal strain gauge for detecting a strain in an extension direction of the piezoelectric element, and a lateral strain gauge for detecting a strain in a direction orthogonal to the extension direction of the piezoelectric element.
2. The piezoelectric-element-driven valve according to claim 1, further comprising a support cylinder for housing the piezoelectric element, the support cylinder being configured to move by extension of the piezoelectric element, wherein the valving element is configured to move by movement of the support cylinder.
3. The piezoelectric-element-driven valve according to claim 2, further comprising a storage device for storing a table indicating a relationship between an output of the strain sensor and a movement amount of the support cylinder, wherein the piezoelectric-element-driven valve is configured to determine movement amounts of the support cylinder and the valving element by the table.
4. A flow control device comprising: a restriction part; a piezoelectric-element-driven valve according to claim 1 provided upstream of the restriction part; a pressure sensor for measuring a gas pressure between the restriction part and the piezoelectric-element-driven valve; and an arithmetic processing circuit for determining a driving voltage of the piezoelectric-element-driven valve according to an output of the pressure sensor.
5. The piezoelectric-element-driven valve according to claim 1, wherein the movement amount of the valving element is monitored by the detection mechanism and the movement amount is compared with that in a normal state to determine a presence or absence of an abnormality in a piezoelectric actuator including the piezoelectric element.
6. The piezoelectric-element-driven valve according to claim 1, wherein the piezoelectric-element-driven valve is a normally-closed-type control valve.
7. The piezoelectric-element-driven valve according to claim 1, wherein the piezoelectric-element-driven valve is used as a variable orifice device, and is configured to detect an orifice opening degree and control an opening position using the detection mechanism.
8. A flow rate control device comprising: the piezoelectric-element-driven valve according to claim 7; and an arithmetic processing circuit provided for the piezoelectric-element-driven valve, wherein the arithmetic processing circuit is configured to feedback control the piezoelectric-element-driven valve according to an output of the strain sensor.

* * * * *